United States Patent [19]

Guenthner

[11] Patent Number: 4,830,652
[45] Date of Patent: May 16, 1989

[54] APPARATUS FOR DRAWING GLASS TAPES

[75] Inventor: Franz Guenthner, Mainz, Fed. Rep. of Germany

[73] Assignee: Schott Glaswerke, Fed. Rep. of Germany

[21] Appl. No.: 45,810

[22] Filed: Apr. 29, 1987

Related U.S. Application Data

[63] Continuation of Ser. No. 707,515, Mar. 4, 1985, abandoned.

[30] Foreign Application Priority Data

Mar. 2, 1984 [DE] Fed. Rep. of Germany ....... 3407697

[51] Int. Cl.$^4$ .............................................. C03B 15/04
[52] U.S. Cl. ........................................ 65/203; 65/204; 65/198
[58] Field of Search .................. 65/90, 178, 195, 196, 65/198, 203–205

[56] References Cited

U.S. PATENT DOCUMENTS

| 1,489,876 | 4/1924 | Whittemore | 65/83 |
| 1,615,841 | 2/1927 | Hitner | 65/90 |
| 1,741,886 | 12/1929 | Stewart | 65/337 |
| 1,781,917 | 11/1930 | Drake | 373/36 |
| 2,236,231 | 3/1941 | Borel | 65/337 |
| 2,691,247 | 10/1954 | Henry et al. | 65/85 |
| 3,231,351 | 1/1966 | Brichard | 65/85 |
| 3,314,776 | 4/1967 | Mambourg et al. | 65/203 |
| 3,615,331 | 10/1971 | Peeters et al. | 65/196 |
| 3,692,510 | 9/1972 | Goldberg et al. | 65/203 |
| 3,801,297 | 4/1974 | Toussaint et al. | 65/203 |
| 3,801,411 | 4/1974 | Brichard | 161/1 |
| 3,834,975 | 9/1974 | Brichard | 65/203 |
| 3,940,256 | 2/1976 | Gulotta et al. | 65/203 |
| 4,277,274 | 7/1981 | Chrisman | 65/178 |

FOREIGN PATENT DOCUMENTS

| 679262 | 5/1965 | Belgium . |
| 7327876 | 1/1974 | France . |
| 673981 | 6/1950 | United Kingdom . |

Primary Examiner—Arthur Kellog
Attorney, Agent, or Firm—Hill, Van Santen, Steadman & Simpson

[57] ABSTRACT

A method for drawing glass sheets of crystallization-sensitive glass such as borosilicate glass or glass ceramic. A melt in a vat of a glass furnace is supplied through a feed channel to a drawing chamber from which a glass sheet is drawn perpendicularly upwardly essentially across a full width of the drawing chamber. The melt in the drawing chamber is heated by at least two current-charged precious metal strips at each of the opposite sides of a drawing plane in a region of the surface of the sheet. This heating occurs in sections at each side of the drawing plans so that the melt is sectionally heated and crystallization at walls of the drawing chamber lying opposite one another at the vertical drawing plane is effectively prevented. In addition, the drawing chamber can be sectionally covered by slides.

11 Claims, 3 Drawing Sheets

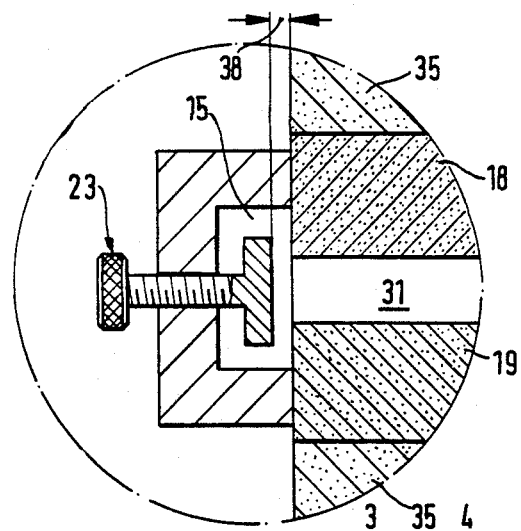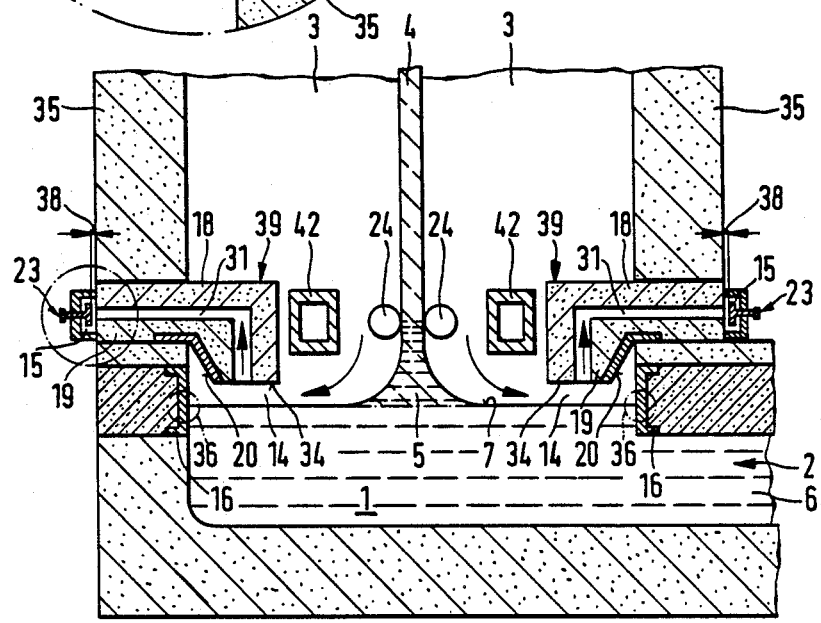

APPARATUS FOR DRAWING GLASS TAPES

This is a continuation of application Ser. No. 707,515, filed Mar. 4, 1985 now abandoned.

BACKGROUND OF THE INVENTION

The invention relates to a method of drawing glass tapes of crystallization-sensitive glass such as borosilicate glass or of glass ceramic. The melt from the vat of a glass furnace is supplied through a feed channel to a drawing chamber from which a glass tape is drawn perpendicularly upwardly and essentially across an entire width of the drawing chamber, and wherein the melt in the drawing chamber is heated.

U.S. Pat. No. 1,615,841, incorporated herein by reference, discloses a method for drawing glass tapes whereby the melt from the melting furnace is supplied through a feed channel having a small cross-section to a drawing chamber from which a glass tape is drawn perpendicularly in an upward direction. The heating of the drawing chamber occurs with two electrodes in the form of metal plates which are disposed at both sides lying opposite the edges of the glass tape. These electrodes extent from the floor of the drawing chamber vat over the entire side wall and extend beyond the edge of the drawing chamber vat. The disadvantage of this heating is that the surface and the remaining melt cannot be differently heated, which is necessary given crystallization-sensitive glasses. A heating in the region of the drawing region along the tape width is not possible since the electrodes are disposed at the end faces. Since only one heating circuit is available, a section-by-section heating is also not possible.

The drawing vat is covered by two component parts which are rigidly disposed at the two sides adjacent to the vertical drawing plane.

The feed of the melt occurs through a non-heatable, closed feed channel which discharges into the drawing chamber below the surface of the melt therein.

British Pat. No. 673,981, incorporated herein by reference, discloses another method wherein a hot zone is generated in the drawing chamber at the glass surface on both sides between the onion and the wall of the drawing chamber. A frame is employed for this purpose, said frame dipping into the melt, extending on both sides parallel to the vertical drawing plane, and comprising surfaces arcing over the surface which are meant to prevent radiant heat losses.

In order to establish these hot zones, at the drawing region there are provided gas or electrical heating units which cannot be differently charged in individual sections. The continuity of the cold film on the glass surface between the drawing region and the wall of the drawing chamber is intended to be interrupted by these two hot zones. A direct heating of the wall of the drawing chamber is not carried out. The drawing chamber can be covered with slides that are adjustable in sections.

It is not possible in this method to heat the drawing chamber wall at the level of the glass surface and therebelow so that, on the one hand, all crystallization is prevented and, on the other hand, the glass is not excessively heated.

U.S. Pat. No. 1,741,886 also discloses that the feed channel can be heated as well. The drawing chamber and feed channel are indirectly heated, i.e. are heated with hot gases at the outside of the glass-carrying, refractory brick.

Usable glass tapes, particularly tapes of borosilicate glass or glass ceramic, cannot be produced with any of the above methods since crystallization at the wall of the drawing chamber lying opposite one another at the vertical drawing plane cannot be prevented.

For example, when processing glass ceramics, the temperature at the point at which the melt separates from the drawing chamber wall cannot drop below a specific value of, for example, 1380° C. because the melt would otherwise crystallize. On the other hand, the melt on its way to the sheet base or root (drawing region) must be cooled to the temperature required for drawing. This can be more than 400° C. lower than the previously mentioned temperature.

It is therefore difficult to simultaneously meet the demands for an adequately high temperature at the point of separation from the wall of the drawing chamber, for a uniform and uninterrupted flow of the melt from the point of separation to the sheet root, and for an adequate cooling over this path to a suitable drawing temperature.

SUMMARY OF THE INVENTION

An object of the invention is to provide a method by means of which glasses and glass ceramics tending toward evaporation and crystallization can be processed into qualitatively high-grade tapes or sheets without the formation of streaks. Another goal of the invention is a drawing apparatus suitable for the implementation of this method.

The invention is based on the perception that this object can be achieved when one is successful in largely reducing the exposed surfaces of the melt at which the melt comes into contact with air, and to regulate and control the melt with respect to its temperature at those locations where this is unavoidable.

In particular, an object of the invention is to control the temperature of the melt at the exposed surface thereof when cooling to the drawing temperature such that a crystallization in the region of the point of separation of the melt from the drawing chamber wall or on the path from the separation point to the drawing root is avoided.

This object is achieved by heating the melt in the drawing chamber in the region of its surface by current-charged precious metal tapes that partially dip into the melt. Furthermore, a cooling air stream is conducted over the surface of the melt at a distance from the point of separation of the melt from the drawing chamber wall, whereby this point of separation can be additionally heated, for example, by means of a radiant heater.

Given this procedure, a dynamic glass surface is established in the drawing chamber and this dynamic glass surface can lie considerably below the static glass surface, for example up to 200 mm. In the drawing tank, this glass surface forms the sole exposed surface of the melt which has not yet been formed into the glass tape. The points at which the melt separates from the wall of the drawing chamber are heatable so that no crystals or devitrification are formed there, even given longer dwell times. The melt is kept at such a high temperature at all contact surfaces so that it cannot devitrify there.

Conducting a cooling air stream across the surface of the melt controls the temperature of the melt flowing to the drawing root without a pronounced cooling effect arising in the region of the separation point from the wall of the drawing chamber. The method is thus particularly suited for drawing glass ceramic.

In order to eliminate an excessive cooling effect due to radiation and due to the cooling air stream at the separation point in the region of the drawing chamber wall, it is advantageous to heat the separation point of the melt, this preferably occurring by a radiant heater directed at the separation point from above.

The invention also relates to an apparatus for the implementation of the invention. The apparatus comprises a drawing chamber, a feed channel connecting the drawing chamber to the vat of the glass furnace, and a drawing means disposed above the drawing chamber. The feed channel is closed over its entire length and is positioned below the surface of the melt in the drawing chamber and has a constricted cross-section in comparison to the width of the drawing chamber.

The apparatus is designed such that it comprises a heating apparatus composed of at least two precious metal strips, tapes, or ribbons. This heating apparatus extends essentially over a width of the drawing chamber in the region of the melt surface at opposite sides of the vertical drawing plane. Preferably, a plurality of such ribbons are provided side-by-side at each side of a central glass sheet drawing plane.

BRIEF DESCRIPTION OF THE DRAWINGS

FIG. 4 is a view of a vertical section through the apparatus of the invention with cooling devices; and FIG. 4A is an expanded partial view of structure relating to valve 23 shown in FIG. 4.

DESCRIPTION OF THE PREFERRED EMBODIMENTS

Figure 1:
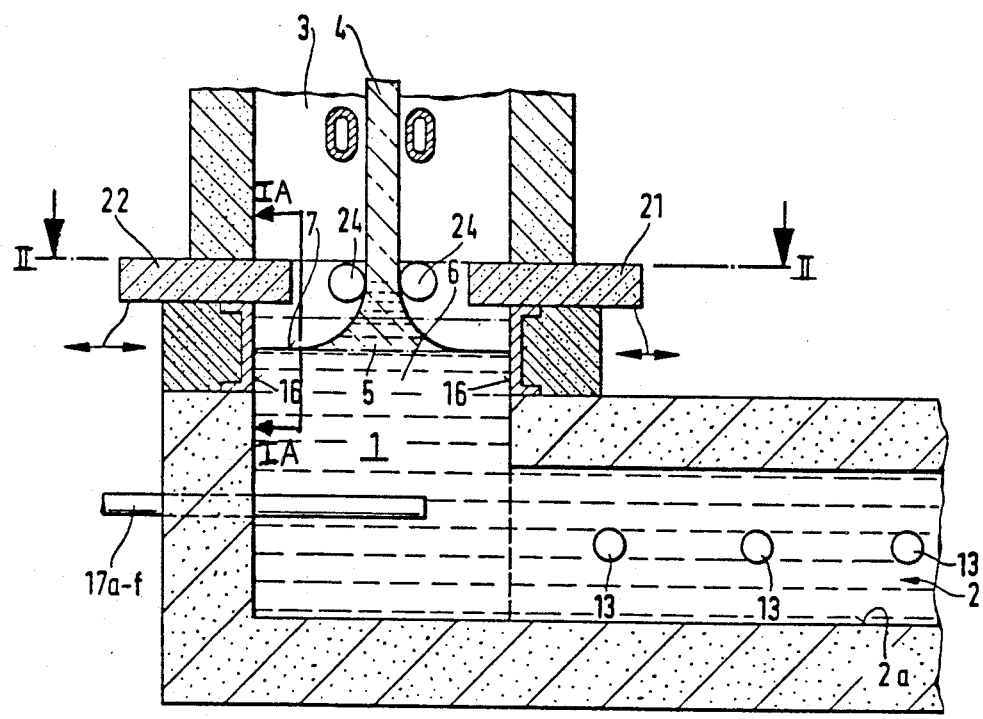
FIG. 1 is a view of a vertical section through the apparatus of the invention.
Figure 2:
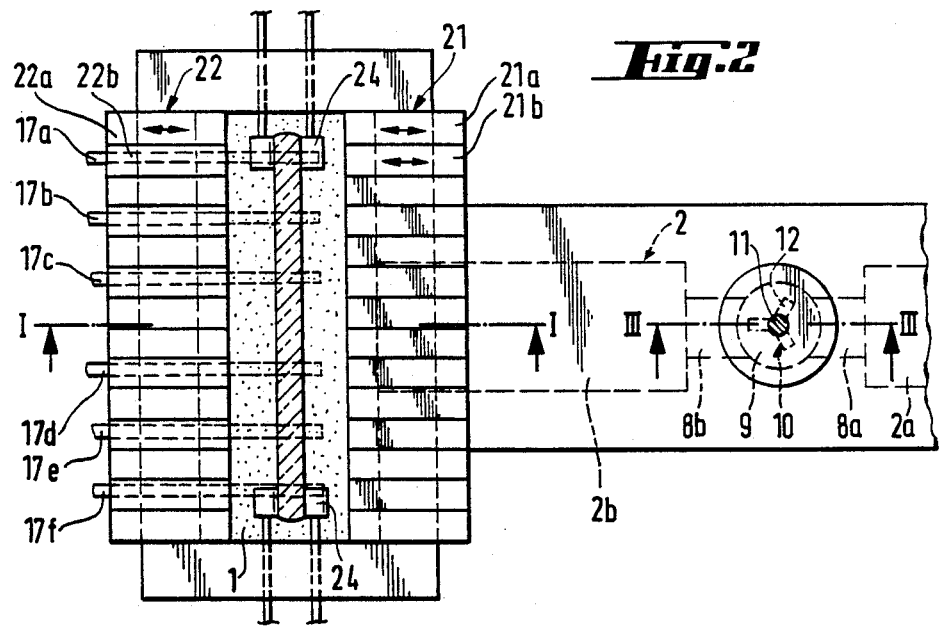
FIG. 2 is an apparatus of the invention in plan view.

As shown in FIGS. 1 and 2, a drawing chamber 1 is provided which is connected to the vat (not shown) of a glass furnace via feed channel 2. A drawing apparatus (not shown) of a known type is disposed above the drawing chamber 1 in a drawing shaft 3. A glass tape 4 is drawn perpendicularly up between guide rollers 24 through the drawing shaft 3 from the melt 6 situated in the drawing chamber 1, whereby a root 5 is formed at the lower end of the glass tape or sheet 4.

Figure 3:
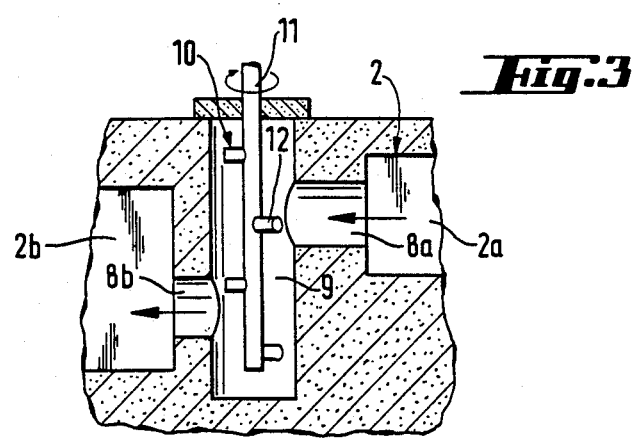
FIG. 3 is a view of a vertical partial section through the agitator unit in the feed channel of the apparatus of the invention.

As may be seen from FIGS. 2 and 3, the feed channel 2 is sub-divided into a section 2a at the vat side and a section 2b at the drawing chamber side, said sections being connected to one another via height-offset connecting channels 8a and 8b as well as a vertically disposed agitation chamber 9 having a circular cross-section. The agitation chamber 9 accepts an agitator 10 which comprises a shaft 11 having agitator blades 12. The shaft 11 is conducted upwardly out of the agitation chamber 9 and communicates with a drive (not shown).

As may be seen from FIG. 2, the feed channel 2 has a significantly smaller width than the drawing chamber 1 whose width essentially corresponds to the width of the glass sheet 4 to be produced. The height of the feed channel 2 or of its sections 2a and 2b roughly corresponds to the channel width, so that the feed channel has an essentially square cross-section. In the interests of a uniform flow through the feed channel 2, it can also have a rounded cross-sectional profile.

As may be seen from FIG. 1, the entire cross-section of the feed channel 2 is disposed below the surface 7 of the glass melt in the drawing chamber 1. Furthermore, the feed channel 2 is provided with heating in the form of electrodes 13. As is usual, the feed channel 2 as well as the drawing chamber 1 are lined with a refractory material.

Figure 1A:
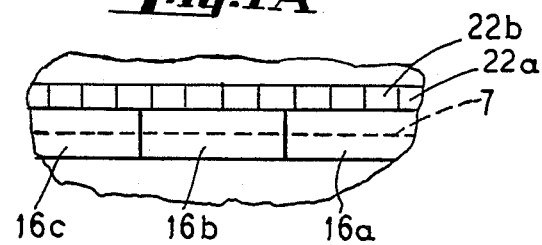
FIG. 1A is a fragmentary view along line IA—IA of FIG. 1.

The drawing chamber 1 is provided with a heating device in the form of a plurality of separately current-charged precious metal tapes, ribbons, or strips 16 shown more clearly as 16a, b, c in FIG. 1A. At least two such ribbons 16a, 16b are provided at each side of the glass sheet 4 in side-by-side parallel fashion. They are each connected to their own heater circuit so that the overall width of the drawing chamber at each side of the sheet 4 is differently heatable in at least two sections. Typically, five such independent heating ribbons each independently controllable may be produced at each side of the glass sheet 4.

As shown in FIG. 4, the cooling of the glass layers flowing to the root 5 is accomplished by means of two integrated parts 39 of refractory material built into the opposite sides of the drawing chamber wall 35. These parts 39 project into the drawing chamber 1 and comprise flow channels 31 as well as a collecting channel 15. The downwardly projecting, inner end of the integrated part 39 forms an air baffle 34 which forms an air chamber above the melt which is connected to the flow channels 31 conducted through the drawing chamber wall and is in communication with the gap 14. The flow channels 31 proceed through the integrated parts 39 and discharge into the collecting channel 15 at the outside of the drawing chamber wall 35. The suction nozzle of a ventilator is connected to the two collecting channels 15 in a fashion that is not shown. A cooling air stream through the gap 14 is generated in this way. This cooling air stream contributes to an essential degree to the fact that the melt flowing from the separation points 36 to the root 5 is cooled.

As shown, the integrated parts 39 can be respectively formed by two separate shaped parts 18 and 19 which enclose the flow channels 31 between one another and which are charged with different quantities of air. Temperature differences in the region of the surface 7 are thus compensated. The width of the gap 38 is set by means of valves 23. At its inside end, the lower shaped piece 38 is provided with a sloped surface to which a radiant heater 20 directed toward the separation point is secured.

Coolers 42 which are essentially symmetrically disposed at opposite sides of the drawing plane promote the cooling of the melt flowing from the separation points 36 to the root 5.

The drawing chamber 1 is also provided with cover slides 21 and 22 at opposite sides of the drawing plane. The cover slides 21 and 22 are guided at the upper ends of the chamber walls extending in the width direction and can be inserted to a greater extent in the direction toward the drawing plane. The cover slides 21 and 22 are also sub-divided into individual slides 21a, 21b, etc. or 22a, 22b, etc.

Also shown in FIGS. 1, 2, and 4 are two pair of guide rollers 24 known in the prior art which serve to prevent a constriction in the width of the glass tape or sheet 4.

It may be seen that, given the described apparatus, the glass melt has an exposed surface in the region of the surface 7 in which it flows toward the root 5. The melt separates from the drawing chamber wall at the separating point 36 which lies at the design level of the surface 7. This point is heatable by the plurality of heating strips 16 at each side of the root 5 so that no crystallizations or devitrifications can form there. Naturally, the temperature at all preceding contact locations with the refractory wall material of the drawing chamber 1 and of the feed channel 2 is kept sufficiently high so that crystal formations are avoided. That occurs by means of the electrodes 17a through 17f, whereby three through nine electrodes having the same number of heating circuits can be provided, depending upon the width of the drawing chamber. After the melt has separated from the separating point 36, the melt flows toward the root 5 under constant motion and with a short dwell time. The cooling of the melt on its path from the separating point 36 to the root 5 is controlled by means of an appropriate setting of the cover slides 21 and 22 or of the air stream at the flow channels 31, and is controlled such that a crystal formation as a consequence of too great a cooling is likewise prevented here. A streak-free, high-quality glass tape or sheet can therefore be produced, and which may be formed of glasses such as borosilicate glass or glass ceramic which tend to evaporate, because the melt traverses an exposed surface region on its path from the tank to the glass sheet only for a short time and under precisely controllable conditions.

Although various minor changes and modifications might be proposed by those skilled in the art, it will be understood that I wish to include within the clais of the patent warranted hereon all such changes and modifications as reasonably come within my contribution to the art.

I claim as my invention:

1. A glass sheet drawing apparatus for crystallization-sensitive glass wherein a glass sheet is drawn from a glass melt, comprising:
    a drawing chamber means for receiving the glass melt such that a surface of the glass melt is at a given design level;
    a closed feed channel means for connecting said drawing chamber means to a glass melt source, an uppermost portion of said closed feed channel means lying below said design level for the surface of the glass melt; and a width of said feed channel means being less than an interior width of said drawing chamber means where said feed channel means enters;
    a drawing means positioned above said drawing chamber means for drawing a glass sheet in a drawing plane;
    at each side of the drawing plane in the drawing chamber means at least two heating strip means for resistance type radiant heating of the melt, the heating strip means being arranged parallel and side-by-side substantially across said interior width of said drawing chamber means, each of the strip means being positioned at said design level for the surface of the melt and extending above and below said design level within a region at the design level;
    each of the at least two heating strip means at each side of the drawing plane of the glass sheet having connection means for connecting each strip means to an independently controllable heater circuit means for indirectly heating the glass melt by independently heating each of the strip means at the opposite sides of the drawing plane so that said interior width of the heating chamber at each side of the glass sheet is differently heatable in at least two sections;
    heating means positioned in said drawing chamber means and below a level of said heating strip means and which are heatable independently of the heating strip means; and
    means for cooling the surface of the melt at said design level for cooling glass layers of the melt flowing to a root of the melt where the glass sheet is drawn from the melt.

2. An apparatus according to claim 1 wherein said heating means comprise electrodes connectable to a plurality of heating circuits positioned in said drawing chamber means below said heating strip means and extending through a side of the heating chamber means lying opposite said feed channel means.

3. An apparatus according to claim 1 wherein heating electrodes are provided centrally in said feed channel means.

4. An apparatus according to claim 1 wherein said means for cooling comprises cover slide means slidable towards and away from opposite sides of said drawing plane above the surface of the melt in said drawing chamber means for selective cooling of the surface of said melt.

5. An apparatus according to claim 1 wherein said drawing means comprises at least two rollers positioned as a pair above said melt surface at opposite sides of said glass sheet so that the glass sheet is guided between said rollers.

6. An apparatus according to claim 1 wherein an agitator is built into said feed channel means.

7. An apparatus according to claim 1 wherein said means for cooling comprises a ventilation means provided at each opposite side of said drawing plane for drawing a cooling stream of air downwardly along the glass sheet, across a surface of said melt towards said heating strip means and then exteriorly.

8. An apparatus according to claim 7 wherein an air baffle is positioned to form a gap above said surface of said melt, said air baffle being between a separation point of said melt from a wall of said drawing chamber means and said drawing plane; and a ventilator means for ventilation of the gap with cooling air between said surface of said melt and said air baffle.

9. An apparatus according to claim 8 wherein said ventilator means comprises a flow channel and wherein said flow channel discharges into a collecting channel at an outside of said drawing chamber means.

10. An apparatus according to claim 9 wherein said flow channel proceeds through said baffle.

11. An apparatus according to claim 9 wherein a radiant heater directed towards said separation point of said melt from said wall is positioned between said baffle and said wall.

* * * * *